(12) United States Patent
Zhou (10) Patent No.: US 10,618,442 B2
(45) Date of Patent: Apr. 14, 2020

(54) AUTOMOBILE SEAT AND AUTOMOBILE SIDE BACK CUSHION

(71) Applicant: SHEN ZHEN STAND BY ME TECHNOLOGY LIMITED, Shenzhen (CN)

(72) Inventor: Zhiping Zhou, Huizhou (CN)

(73) Assignee: SHENZHEN STAND BY ME TECHNOLOGY LIMITED, Shenzhen (CN)

(*) Notice: Subject to any disclaimer, the term of this patent is extended or adjusted under 35 U.S.C. 154(b) by 0 days.

(21) Appl. No.: 16/112,749

(22) Filed: Aug. 26, 2018

(65) Prior Publication Data
US 2020/0039407 A1 Feb. 6, 2020

(30) Foreign Application Priority Data
Aug. 3, 2018 (CN) .......................... 2018 1 0882291

(51) Int. Cl.
*B60N 2/885* (2018.01)
*B60N 2/853* (2018.01)

(52) U.S. Cl.
CPC ............ *B60N 2/853* (2018.02); *B60N 2/885* (2018.02)

(58) Field of Classification Search
CPC .... B64D 11/0642; B60N 2/838; B60N 2/868; B60N 2/882; B60N 2/885; B60N 2/2851
USPC ........................................................ 297/408
See application file for complete search history.

(56) References Cited

U.S. PATENT DOCUMENTS

| 5,586,810 A * | 12/1996 | Liu ........................ | A47C 7/38 297/406 |
| 7,559,608 B2 * | 7/2009 | Miyahara ................ | B60N 2/20 297/408 |
| 8,295,535 B2 * | 10/2012 | Tracy .................... | B64D 11/0015 297/217.4 |
| 2001/0040401 A1 * | 11/2001 | Lin ........................ | B60N 2/885 297/397 |
| 2012/0161489 A1 * | 6/2012 | Nam ...................... | A47C 7/38 297/406 |
| 2013/0181496 A1 * | 7/2013 | Nawaz ................... | B60N 2/806 297/408 |
| 2015/0145307 A1 * | 5/2015 | Arriola .................. | B60N 2/882 297/397 |
| 2016/0130003 A1 * | 5/2016 | Arriola .................. | B60N 2/882 297/397 |
| 2018/0001790 A1 * | 1/2018 | Erbacher ................ | B60N 2/995 |

(Continued)

*Primary Examiner* — Kyle J. Walraed-Sullivan
(74) *Attorney, Agent, or Firm* — Hemisphere Law, PLLC; Zhigang Ma (57) ABSTRACT

The present invention discloses an automobile side back cushion, including: a mounting rod, including a first chute and a second chute disposed at an interval, and an adjusting channel disposed between the first chute and the second chute; a first side cushion and a second side cushion, which are respectively connected to two ends of the mounting rod; and a width adjusting structure, including: a first fastening frame, including at least one first inserting rod groove accommodated in the first chute and a first gear bar fixed on the outer side of the first inserting rod groove; a second fastening frame, including at least one second inserting rod groove accommodated in the second chute, and a second gear bar fixed on the outer side of the second inserting rod groove; and an adjusting gear disposed in the adjusting channel.

11 Claims, 8 Drawing Sheets

(56) References Cited

U.S. PATENT DOCUMENTS

2018/0370398 A1* 12/2018 Chiang .................. B60N 2/885
2019/0152371 A1* 5/2019 Carlson .................. B60N 2/885

* cited by examiner

FIG. 11

AUTOMOBILE SEAT AND AUTOMOBILE SIDE BACK CUSHION

FIELD OF THE DISCLOSURE

The present invention relates to the field of automobile accessories, and in particular to an adjustable automobile side back cushion mounted on inserting rods of an automobile seat headrest.

BACKGROUND

The existing automobile seat which only has a headrest cannot support the face of a passenger from the side, and provides fixed limitation to the head to play a role of protecting the head when an accident occurs during driving of an automobile. However, if the side back cushion of the automobile is increased, time and labor are wasted in use when an external tool is required for mounting or dismounting. Sometimes, it is difficult to use if people just forget to carry the tool such as a screwdriver. Since such automobile side back cushion is integrally designed, the defect of wasting packaging materials will be caused.

SUMMARY

In view of the above defects and deficiencies of the prior art, that is, in view of the above, it is necessary to provide a convenient-to-adjust headrest which is mounted on both sides of the automobile seat headrest.

The present disclosure provides an automobile side back cushion, disposed on a first inserting rod and a second inserting rod on the top of a seat, wherein the automobile side back cushion includes: a mounting rod, including a first chute and a second chute disposed at an interval, and an adjusting channel disposed between the first chute and the second chute; and the first chute and the second chute being communicated by the adjusting channel; and a first side cushion and a second side cushion, which are respectively connected to two ends of the mounting rod; the automobile side back cushion further includes a width adjusting structure, including: a first fastening frame, including at least one first inserting rod groove accommodated in the first chute, and a first gear bar fixed on the outer side of the first inserting rod groove; a second fastening frame, including at least one second inserting rod groove accommodated in the second chute, and a second gear bar fixed on the outer side of the second inserting rod groove; and an adjusting gear disposed in the adjusting channel; wherein the first fastening, frame and the second fastening frame are disposed in a mirror image manner; the first gear bar and the second gear bar oppositely extend along the adjusting channel and are simultaneously occluded with the adjusting gear, such that the adjusting gear drives the first fastening frame and the second fastening frame to be away from or close to each other.

In an embodiment, the width adjusting structure further includes: an adjusting knob disposed on the outer side of the mounting rod and a connecting shaft; and the adjusting knob is connected, to the adjusting gear by the connecting shaft to control the adjusting gear to rotate.

In an embodiment, the two ends of the mounting rod are provided with a first, rotary connecting member and a second rotary connecting member respectively; the first rotary connecting member includes a first columnar part connected to the mounting rod and a first screw cap away from the mounting rod and in threaded connection with the first columnar part; and the first side cushion is provided with a first sleeve adapted to the first columnar part, and the first sleeve sleeves the first columnar part and is fixed by the first screw cap; the second rotary connecting member includes a second columnar part connected to the mounting rod and a second screw cap away from the mounting rod and in threaded connection with the second columnar part; and the second side cushion is provided with a second sleeve adapted to the second columnar part, and the second sleeve sleeves the second columnar part and is fixed by the second screw cap; and the cushion surfaces of the first side cushion and the second side cushion are opposite to each other.

In an embodiment, the first columnar part and the second columnar part are convexly provided with a bayonet respectively, and the inner wall of the first sleeve and the inner wall of the second sleeve are concavely provided with a bayonet groove adapted to the bayonet respectively, such that the first sleeve and the second sleeve are stabilized with the first columnar part and the second columnar part.

In an embodiment, certain sides of the first columnar part and the second columnar part toward the mounting rod are provided with an annular groove respectively, the inner wall of the annular groove is provided with a plurality of gear slots, and a bent part is adapted to the gear slots; the mounting rod is provided with an adapted raised part toward the groove, and an elastic piece groove is disposed from the outer wall of the raised, part; and the automobile side back cushion further includes an elastic piece, one end of the elastic piece is fixed in the elastic piece groove, and the other end extends along the direction, gradually away from the raised part, of the end surface of the mounting rod to form the bent part, and the bent part cooperates with the gear slots to realize the rotation of the first columnar part and the second columnar part around a raised part main shaft in a split gear manner.

In an embodiment, certain surfaces of the first sleeve and the second sleeve toward the first screw cap, and the second screw cap respectively are provided with a plurality of bumps; and the first screw cap and the second screw cap are provided with a plurality of pits adapted to the bumps by corresponding to the first sleeve and the second sleeve respectively.

In an embodiment, the first side cushion and/or the second side cushion includes: a decorative wing cover and a soft cushion part corresponding to the decorative wing cover, a bracket is further disposed between the decorative wing cover and the soft cushion part, and the soft cushion part wraps the bracket; and the bracket extends toward the decorative wing cover to form a hook part, the decorative wing cover is provided with a groove corresponding to the hook part, and the connection between the decorative wing cover and the soft cushion part is realized by combining the hook part and the groove.

In an embodiment, the first side cushion and/or the second side cushion includes: a wing piece, a soft filler wrapping the periphery of the wing piece, a soft outer wrap wrapping the soft filler and a decorative plate disposed back to the cushion surface; the decorative plate extends toward the wing piece to form a mounting raised column, and the mounting raised column penetrates through the soft filler to be connected to the wing piece.

The present disclosure also provides an automobile side back cushion, disposed on a first inserting rod and a second inserting rod on the top of a seat, wherein the automobile side back cushion includes: a mounting rod, including a first fastening hole and a second fastening hole adapted to the first inserting rod and the second inserting rod, such that the mounting rod is fixed on the first inserting rod and the second inserting rod; and a first side cushion and a second side cushion, which are respectively connected to two ends of the mounting rod; wherein the two ends of the mounting rod are respectively provided with a first rotary connecting member and a second rotary connecting member; the first rotary connecting member includes a first columnar part connected to the mounting rod and a first screw cap away from the mounting rod and in threaded connection with the first columnar part; and the first side cushion is provided with a first sleeve adapted to the first columnar part, and the first sleeve sleeves the first columnar part and is fixed by the first screw cap; the second rotary connecting member includes a second columnar part connected to the mounting rod and a second screw cap away from the mounting rod and in threaded connection with the second columnar part; and the second side cushion is provided with a second sleeve adapted to the second columnar part, and the second sleeve sleeves the second columnar part and is fixed by the second screw cap; and the cushion surfaces of the first side cushion and the second side cushion are opposite to each other.

The present disclosure also provides an automobile seat, including a seat body and a headrest above the seat body, wherein the bottom of the headrest is provided, with inserting rods, the top of the seat body is provided with inserting, holes corresponding to the inserting rods, the headrest is fixed with the seat body by the inserting rods and the inserting holes, the automobile seat further includes the above automobile side back cushion, and the automobile side back cushion is fixed between the seat body and the headrest by the inserting rods.

Beneficial Effects: compared with the prior art, when the present invention is used, according to different automobile models, the width, of the product of the present invention can be adjusted by only rotating an adjusting knob, so as to adapt to the distance of specific headrest inserting rods. There is no need for a tool such as an external screwdriver for assembling. The more convenient and more labor-saving effects in adjustment are achieved. Besides, the structure is more flexible, and is simple and convenient to disassemble and convenient to store when not in use.

BRIEF DESCRIPTION OF THE DRAWINGS

In order to more clearly explain the technical solutions of embodiments of the present application, the drawings required in description of the embodiments will be briefly introduced. It is obvious that the described drawings below are some embodiments of the present disclosure, and those ordinary skilled in the art can obtain other drawings according to these drawings, without paying any inventive work.

REFERENCE SIGNS IN THE DRAWINGS

| Number | Name | Number | name |
|---|---|---|---|
| 10 | Mounting rod | 407 | Hook part |
| 101 | First chute | 408 | Groove |
| 1011 | Mounting groove | 501 | Second sleeve |
| 102 | Second chute | 5011 | Second abutting part |
| 103 | Raised part | 5012 | Second bayonet groove |
| 1031 | Elastic piece groove | 502 | Soft outer wrap |
| 1032 | Notch | 503 | Decorative plate |
| 104 | Elastic piece | 504 | First mounting hole |
| 1041 | Bent part | 505 | Second mounting hole |
| 105 | Mounting rod upper cover | 506 | Mounting raised column |
| 106 | Mounting rod lower cover | 507 | Decorative groove |
| 107 | Small screw | 508 | Wing piece |
| 108 | Adjusting channel | 509 | Framework |
| 109 | Limiting struture | 110 | Fixing mechanism |
| 20 | First rotary connecting member | 1110 | Rear cover plate |
| 203 | First screw cap | 1120 | Fixing hole |
| 205 | First columnar part | 1121 | Fixing groove |
| 30 | Second rotary connecting member | 210 | Cylindrical hole |
| 303 | Second screw cap | 1130 | Fastener |
| 305 | Second columnar part | 1131 | Fixing screw |
| 40 | First side cushion | 1132 | Fixing nut |
| 50 | Second side cushion | 120 | Inserting rod cover |
| 60 | Width adjusting structure | 1201 | Mounting part |
| 601 | Adjusting knob | 201 | First groove |
| 602 | Connecting shaft | 2011 | First annular step part |
| 70 | Adjusting gear | 3011 | Second annular step part |

-continued

| Number | Name | Number | name |
|---|---|---|---|
| 80 | First fastening frame | 2012 | First bayonet |
| 90 | Second fastening frame | 3012 | Second bayonet |
| 801 | First gear bar | 202 | Second groove |
| 803 | First inserting rod groove | 2013 | Gear slot |
| 804 | Third inserting rod groove | 130 | Locking screw |
| 901 | Second gear bar | 1301 | Screw |
| 903 | Second inserting rod groove | 1302 | Gasket |
| 904 | Fourth inserting rod groove | 4013 | Bump |
| 401 | First sleeve | 2032 | Pit |
| 4011 | First abutting part | 01 | Automobile side back cushion |
| 4012 | First bayonet groove | 02 | Seat body |
| 402 | Soft cushion part | 021 | First inserting hole |
| 403 | Bracket | 022 | Second inserting hole |
| 404 | Outer casing | 03 | Headrest |
| 405 | Decorative wing cover | 031 | First inserting rod |
| 406 | LOGO position | 032 | Second inserting rod |

DETAILED DESCRIPTION OF PREFERRED EMBODIMENTS

The specific structural and functional details disclosed herein are only representative and are intended for describing exemplary embodiments of the disclosure. However, the disclosure can be embodied in many forms of substitution, and should not be interpreted as merely limited to the embodiments described herein.

In the description of the disclosure, directional terms used herein such as "up", "down", "front", "back", "left", "right", "inside", "outside", "side", refer only to the directions of the attached drawings. Therefore, the directional terms used herein are intended to illustrate and understand the present disclosure, rather than to limit the present disclosure. In addition, in the drawings, structures having similar or same structures are denoted by the same reference numerals.

In the present invention, the terms "connected", "fixed" and the like should be understood broadly, unless otherwise clearly defined and limited. For example, the "fixed" may be fixedly connected, or detachably connected, or may be integrated. It may be mechanically connected or electrically connected, may be directly connected or indirectly connected through an intermediate medium, and may be internal communication of two elements or an interaction relationship of two elements unless explicitly defined otherwise. The specific meanings of the above terms in the present invention can be understood by those ordinary skilled in the art according to specific conditions.

In addition, the descriptions of "first", "second", and the like in the present invention are used for the purpose of description only, and cannot be understood as indicating or implying the relative importance or implicitly indicating the number of denotative technical features. Thus, the features defined by the "first" and "second" may include at least one of the features explicitly or implicitly. In addition, the technical solutions between various embodiments may be combined with each other, but must be based on the implementation by those ordinary skilled in the art. When the combination of the technical solutions is contradictory or impossible to implement, it should be considered that the combination of the technical solutions does not exist and is not in the scope of protection required by the present invention either.

Figure 1:
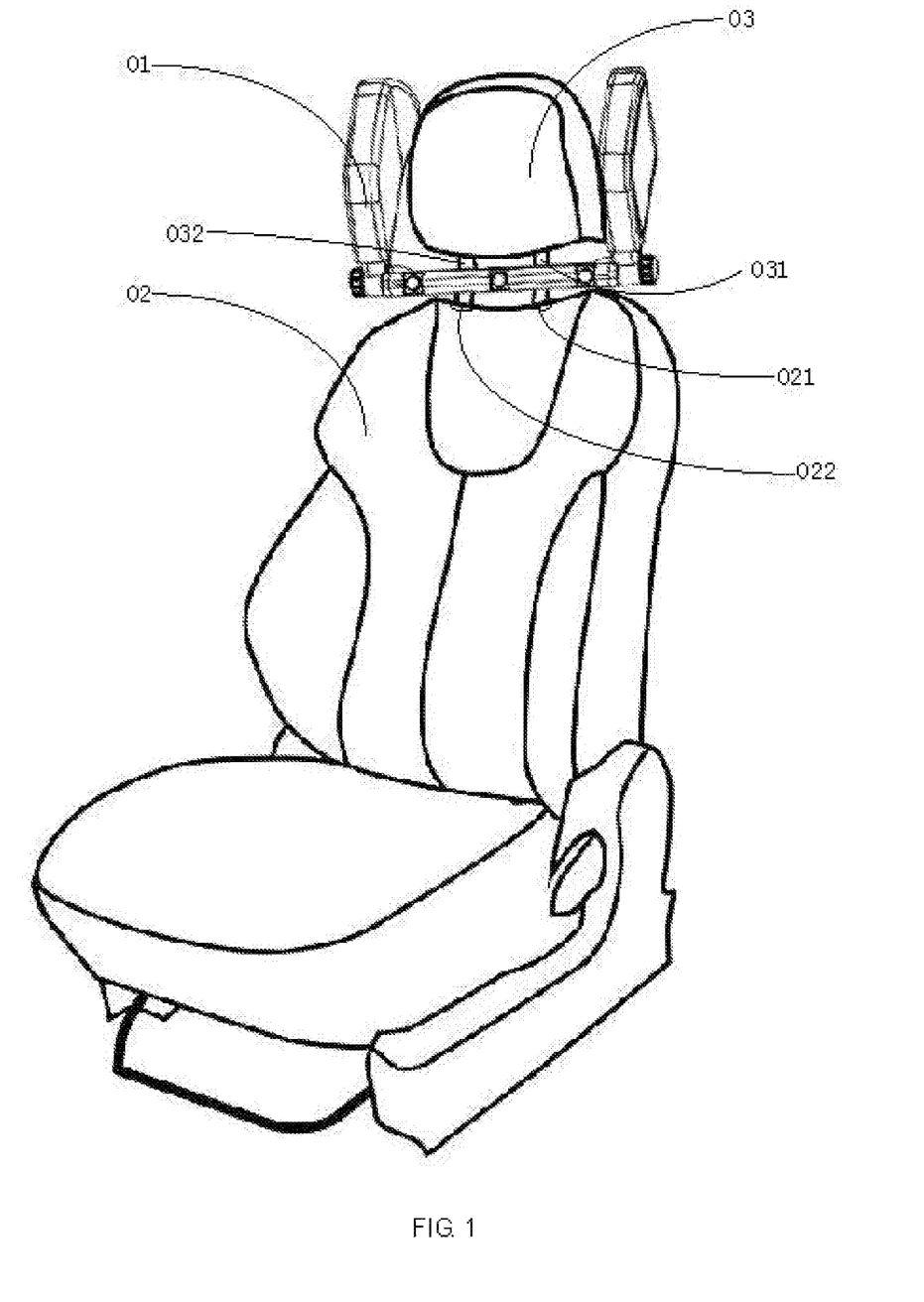
FIG. 1 is a view of a use state of an automobile seat provided with an automobile side back cushion according to the present invention.
Figure 2:
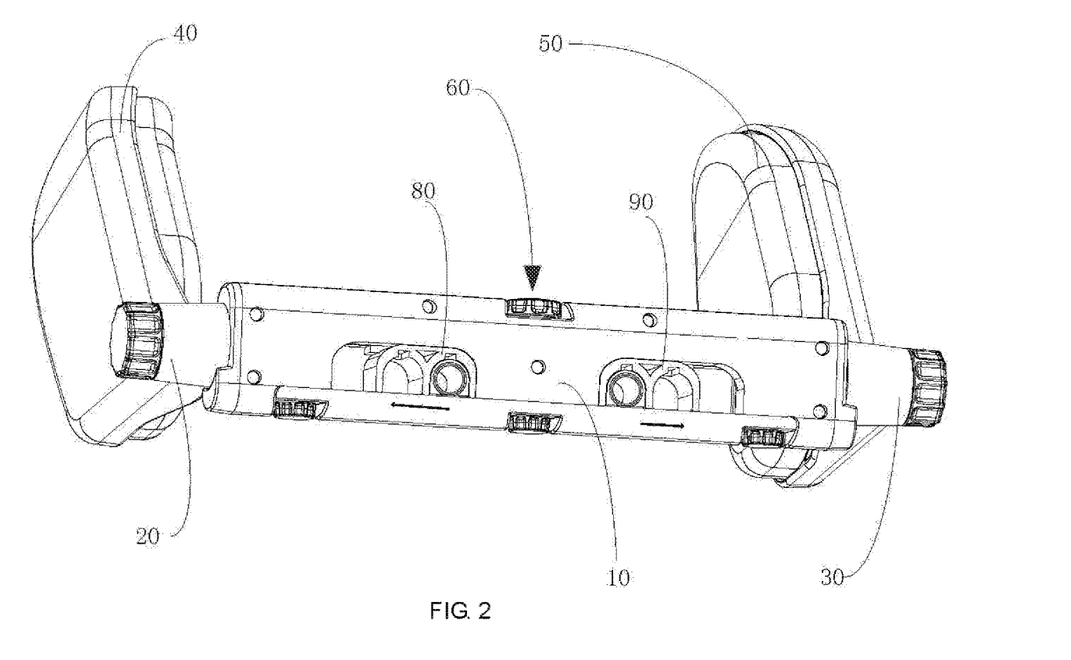
FIG. 2 is a schematic structural view of an automobile side cushion according to the present invention.

As shown in FIG. 1 and FIG. 2, the embodiment of the present invention provides an automobile side back cushion, which can be applied to various automobiles and various types of automobile seats. Specifically, the automobile seat according to the present embodiment illustratively includes: a seat body 02 and a headrest 03 above the seat body 02. The bottom of the headrest 03 is provided with a first inserting rod 031 and a second inserting rod 032. The top of the seat body 02 is provided with a first inserting hole 021 corresponding to the first inserting rod 031 and a second inserting hole 022 corresponding to the second inserting rod 032. The headrest 03 is fixed with the seat body 02 by the first inserting rod 031, the second inserting rod 032, the first inserting hole 021, and the second inserting hole 022.

The automobile side back cushion 01 according to the present embodiment is disposed between the seat body 02 and the headrest 03 and is fixed, on the first inserting rod 031 and the second inserting rod 032. In combination with FIG. 2, the automobile side back cushion 01 according to the present embodiment includes: a mounting rod 10, wherein the mounting rod 10 includes a first chute 101 and a second chute 102 disposed at an interval, and an adjusting channel 108 disposed between the first chute 101 and the second chute 102, and the first chute 101 and the second chute 102 are communicated by the adjusting channel 108; and a first side cushion 40 and a second side cushion 50. The side cushion 40 and the second side cushion 50 are respectively connected to the two ends of the mounting rod 10. The cushion surfaces of the first side cushion 40 and the second side cushion 50 are opposite.

Further, the automobile side back cushion is further provided with a width adjusting structure 60, including: a first fastening frame 80, a second fastening frame 90, the adjusting channel 108, and an adjusting gear 70 disposed between the first fastening frame 80 and the second fastening frame 90. The first fastening frame 80 and the second fastening frame 90 slide close to or away from each other in the adjusting channel 108 by the adjusting gear 70.

The first fastening frame 80 includes at least one first inserting rod groove 803 accommodated in the first chute 101 and a first gear bar 801 fixed on the outer side of the first inserting rod groove 803.

The second fastening frame 90 includes at least one second inserting rod groove 903 accommodated in the second chute 102, a second gear bar 901 fixed on the outer side of the second inserting rod groove 903, and the adjusting gear 70 disposed in the adjusting channel 108.

Figure 11:
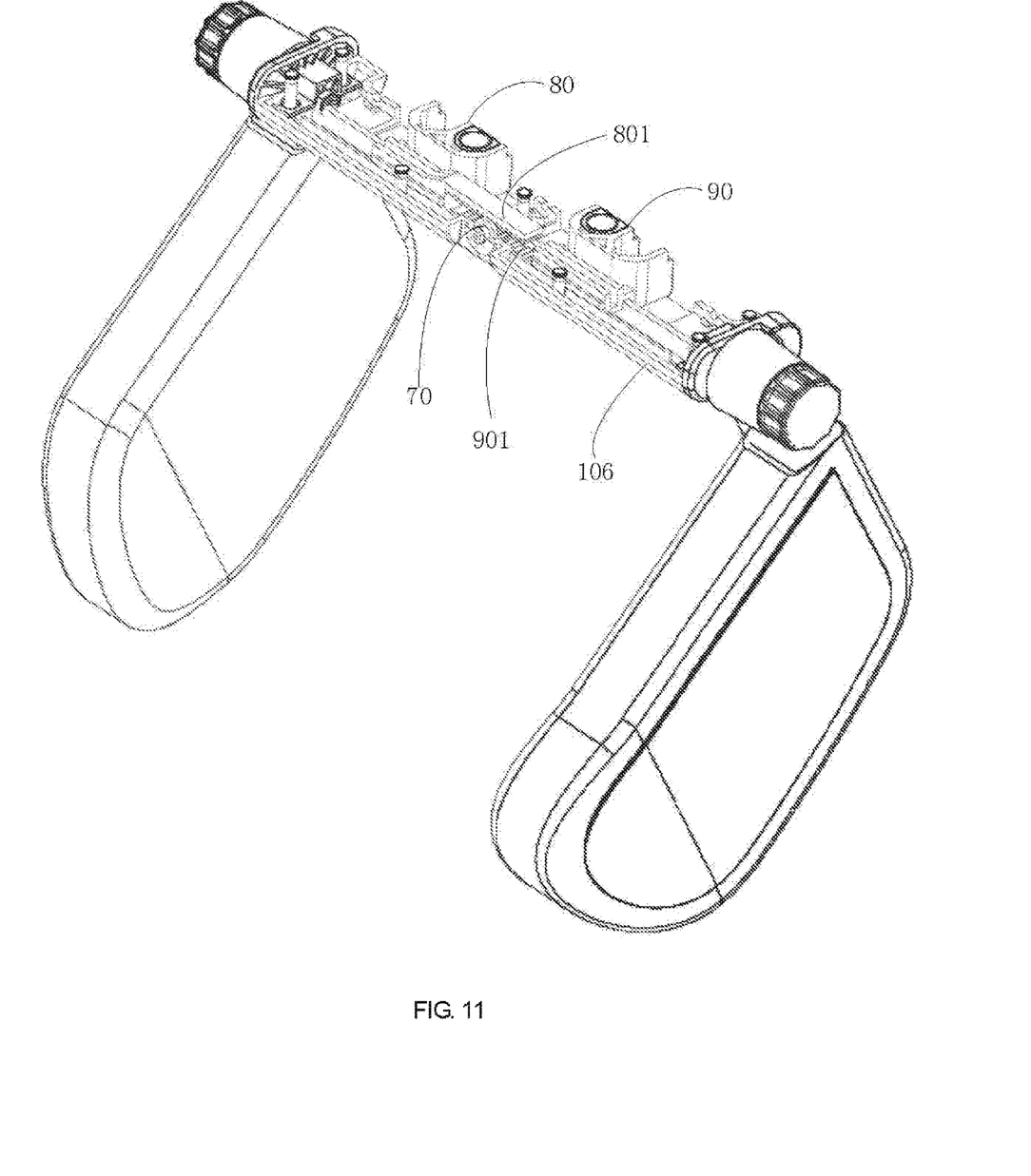
FIG. 11 is a schematic view of the internal structure of a width adjusting structure according to the present invention.

The first gear bar 801 and the second gear bar 901 extend oppositely along the adjusting channel 108 and are simultaneously occluded with the adjusting gear 70, such that the adjusting gear 70 drives the first fastening frame 80 and the second fastening frame 90 to be away from or close to each other. Specifically, referring to FIG. 11, the first fastening frame 80 and the second fastening frame 90 are disposed in a mirror image manner. The adjusting gear 70 is clamped between the first gear bar 801 and the second gear bar 901. The adjusting gear 70 rotates (for example, counterclockwise) to drive the first gear bar 801 and the second gear bar 901 to be close to each other, thereby causing, the first fastening frame 80 and the second fastening frame 90 to be close to each other. Similarly, the adjusting gear 70 rotates (for example, clockwise) to drive the first gear bar 801 and the second gear bar 901 to be away from each other, thereby causing the first fastening frame 80, and the second fastening frame 90 to be away from each other. Specifically, by the adjusting gear 70, the first fastening frame 80 and the second fastening frame 90 can be simultaneously moved relative to each other to realize a telescopic function. In the present embodiment, the telescopic range is 0-40 mm. Due, to such a feature, the present invention is allowed to adapt to different distances of the two headrest inserting rods on the automobile seat headrest.

Figure 3:
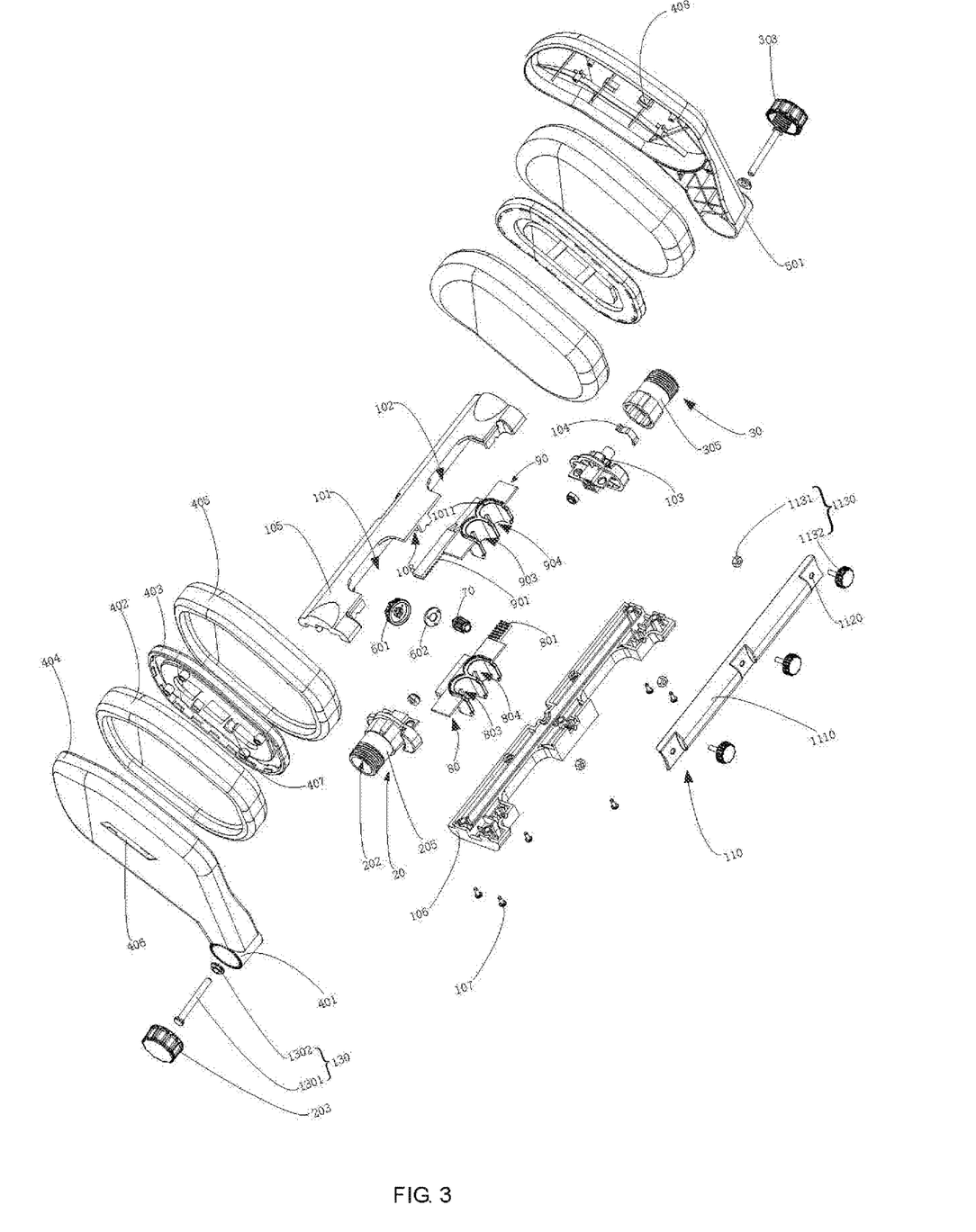
FIG. 3 is an exploded view of the automobile side back cushion according to the present invention.

Preferably, as shown in FIG. 3, the width adjusting structure 60 further includes: an adjusting knob 601 disposed on the outer side of the mounting frame 10 and a connecting shaft 602. The adjusting knob 601 is connected to the adjusting gear 70 by the connecting shaft 602, to control the adjusting gear 70 to rotate. When in use, according to a specific automobile model, the adjusting gear 108 can be driven by only rotating the adjusting gear 70, to adjust the distance between the first fastening frame 80 and the second fastening frame 90, so that the first inserting rod groove 803 and the second inserting rod groove 903 just, correspond to the first inserting rod 031 and the second inserting rod 032. Therefore, the product, according to the invention is adaptive to the mounting distance of a specific headrest, and can be assembled without an external tool such as a screwdriver, and more convenient and more laborsaving effects in adjustment are achieved.

Further, the first inserting rod groove 803 in the first fastening frame 80 and the second inserting rod groove 903 in the second fastening frame 90 are a U-shaped groove of a semi-closed "U"-shaped structure, which is configured to be buckled on the two inserting rods from the front (or back) of the headrest. In the embodiment of the invention, one surface of the U-shaped groove 803 perpendicular to the two U-shaped opening end parts is provided with a mounting groove 1011. In the present embodiment, the first, fastening frame 80 is further provided with a third inserting rod groove 804 disposed alongside the first inserting rod groove 803. The second fastening frame 90 is provided with a fourth inserting rod groove 904 disposed alongside the second inserting rod groove 903, so that the automobile side back cushion can adapt to different distances between the two headrest inserting rods on the automobile seat headrest.

Figure 4:
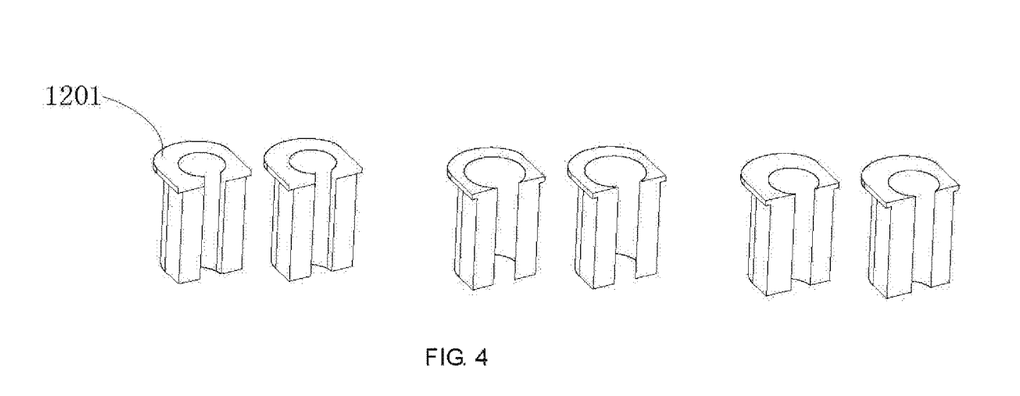
FIG. 4 is a schematic view of inserting rod covers of different sizes of the automobile side back cushion according to the present invention.

Preferably, as shown in FIG. 4, the inserting rod covers 120 of different sizes are further included. The inserting rod cover is a U-shaped, structure, and a mounting part 1201 is convexly disposed on one end of the inserting rod cover 120 and the outer diameter of the inserting rod cover 120 is matched with the inner diameter of the U-shaped groove 803. The inserting rod cover 120 and the mounting groove 1011 of the U-shaped groove 803 are matched and fixed on the "U"-shaped groove by the mounting part 1201. The inner diameter of the inserting rod cover 120 ranges from 10 mm to 16 mm. During mounting, the inserting rod sleeves 120 of different sizes can be selected for matching according to different diameter sizes of the headrest inserting rods of different automobile seats. The inserting rod sleeve 120 can be effectively fixed with the different diameters of the headrest inserting rods of different automobile seats. The effect that the product of the invention is widely adapts to different automobile models can be further achieved.

Further, the mounting rod 10 further includes a fixing mechanism 110. The fixing mechanism 110 includes a rear cover plate 1110, and the rear cover plate 1110 is further provided with at least one fixing hole 1120 connected to the mounting rod 10 by at least one fastener 1130. In the present embodiment, the rear cover plate 1110 is provided with three fixing holes 1120 at intervals and at least three matched fasteners 1130. The fastener 1130 consists of a fixing screw 1131 and a fixing nut 1132. The rear cover plate 1110 is further provided with three fixing grooves 1121 at intervals in the fixing holes 1120 for receiving the fixing nuts 1132. When in use, the rear cover plate 1110 is fixed on the mounting rod 10 by matching the fixing screws 1131 with the fixing nuts 1132, and then the product of the invention can be fixed on the headrest, inserting rods of the automobile seat.

Optionally, the mounting rod 10 may be integrally formed, or as shown in FIG. 3 in the present embodiment, the mounting rod 10 consists of a mounting rod upper cover 105 and a mounting rod upper cover 106, and is fixed by a small screw 107.

Figure 6:
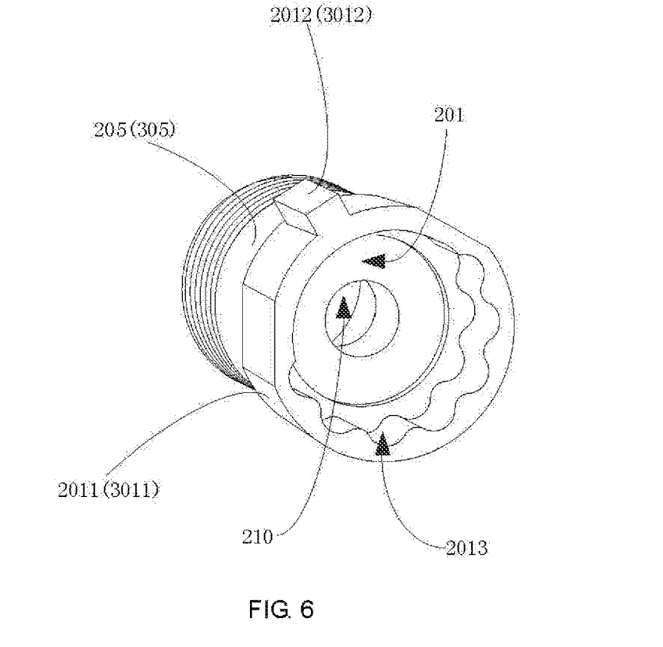
FIG. 6 is a schematic view of a first rotary connecting member and a second rotary connecting member according to the present invention.

Further, in combination with FIG. 3 and FIG. 6, the first rotary connecting member 20 and the second rotary connecting member 30 may be, for example, cylindrical structures.

The first rotary connecting member 20 includes a first columnar part 205 connected to the mounting rod 10 and a first screw cap 203 away from the mounting rod 10 and in threaded connection with the first columnar part 205. The first side cushion 40 is provided with a first sleeve 401 adaptive to the first columnar part 205. The first sleeve 401 sleeves the first columnar part 205 and is fixed by the first screw cap 203.

Similarly, the second rotary connecting member 30 includes a second columnar part 305 connected to the mounting rod 10 and a second screw cap 303 away from the mounting rod 10 and in threaded connection with the second columnar part 305. The second side cushion 50 is provided with a second sleeve 501 adapted to the second columnar part 305. The second sleeve 501 sleeves the second columnar part 305 and is fixed by the second screw cap 303.

Due to the feature, the first side cushion 40, the second side cushion 50 and the mounting rod 10 can form a detachable structure, which is convenient to mount when in use. The mounting rod can be connected to the first side cushion 40 and the second side cushion 50 by only twisting the first screw cap 203 and/or the second screw cap 303. When not in use, the structure can be loosened by only twisting the first screw cap 203 and/or the second screw cap 303. The first side cushion 40 and/or the second side cushion 50 can be disassembled at any time without the aid of an external tool such as a screwdriver. The storage is convenient, and the produced packaging material can also be saved.

The mounting rod 10 in the present embodiment is provided with a width adjusting structure 60 which may be an adjustable mounting rod. Of course, in other specific embodiments, the mounting rod 10 may also be a non-adjustable structure. For example, the mounting rod includes a first fastening hole (which may be the first inserting rod groove 803 in FIG. 3) and a second fastening hole (which may be, for example, the second inserting rod groove 903 in FIG. 3). By pulling out the headrest together with the first inserting rod, and the second inserting rod, the first inserting rod and the second inserting rod penetrate through the first fastening hole and the second fastening hole, adaptive to the first inserting rod and the second inserting rod, in the mounting rod, and are then inserted back into the seat body. The mounting rod can also be fixed between the headrest and the seat body. That is, the first side cushion 40 and/or the second side cushion 50 can be applied to the adjustable mounting rod, and can also be connected to the non-adjustable mounting rod.

In combination with FIG. 6, certain sides of the first columnar part 205 and the second columnar part 305 toward the mounting rod 10 are provided with an annular first groove 201 respectively. The inner wall of the annular first, groove 201 is provided with a plurality of gear slots 2013.

A cylindrical hole 210 penetrating through the whole first columnar part 205 is formed in the bottom of the first groove 201. A locking screw 130 penetrates through the cylindrical hole 210 and is screwed into the mounting rod 10, so that the first columnar part 205 is fixed with the mounting rod 10. In order to accommodate the locking screw 130 in the first columnar part 205, a second groove 202 is disposed in the first columnar part 205 back to the first groove 201. The first groove 201 and the second groove 202 are communicated by the cylindrical hole 210.

In combination with FIG. 3, it can be known that in the present embodiment, the first rotary connecting member 20 further includes a locking member 130. The locking member 130 consists of a screw 1301 and a gasket 1302. After the first rotary connecting member 20 and the second rotary connecting member 30 are mounted on both ends of the mounting rod 10, the first rotary connecting member 20 and the second rotary connecting member 30 can be tightly locked on head and tail end surfaces of the mounting rod 10 by the cylindrical hole 210, the screw 1301 and the gasket 1302, thereby ensuring a more stable structure and safer use of the product.

Figure 8:
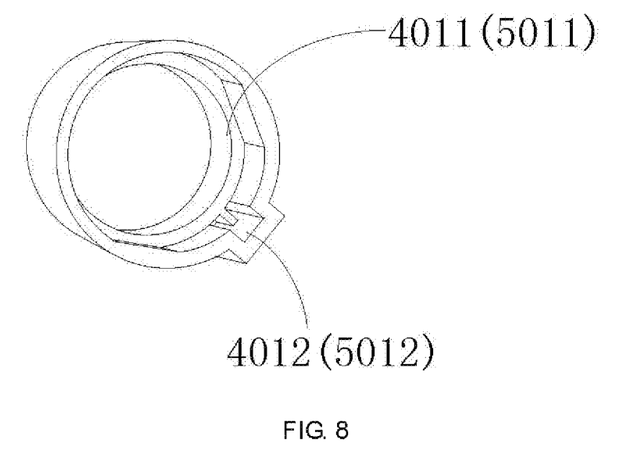
FIG. 8 is a schematic structural view of a sleeve according to the present invention.

As shown in FIG. 6, the first columnar part 205 of the first rotary connecting member 20 is further provided with a first annular step part 2011. The outer side wall of the first annular step part 2011 is further provided with a first bayonet 2012. Referring to FIG. 8, a first abutting part 4011 is disposed in the first sleeve 401, and a first bayonet groove adaptive to the first bayonet 2012 is disposed in the inner wall of the first sleeve 401. The end surface of the first annular step part 2011 is abutted against the first abutting part 4011 of the first sleeve 401, The first bayonet 2012 is engaged in the first bayonet groove 4012.

Similarly, the second columnar part 305 of the second rotary connecting member 30 is provided with a second annular step part 3011. The outer side wall of the second annular step part 3011 is further provided with a second bayonet 3012. A second abutting part 5011 is disposed in the sleeve 501, and, a second bayonet groove 5012 adaptive to the second bayonet 3012 is disposed in the inner wall of the second sleeve 501. The end surface of the second annular step part 3011 is abutted against the second abutting part 5011 of the second sleeve 501. The second bayonet 3010 is engaged in the second bayonet groove 5012.

Due to the arrangement of such feature, the connecting structure between the first side cushion 40 and the second side cushion 50 and the mounting rod 10 is more stable. When the first side cushion 40 and the second side cushion 50 are fixed in a certain gear position, the easiness in falling caused by structural instability will not be generated by the action of gravity or the shake in a driving process.

Figure 10:
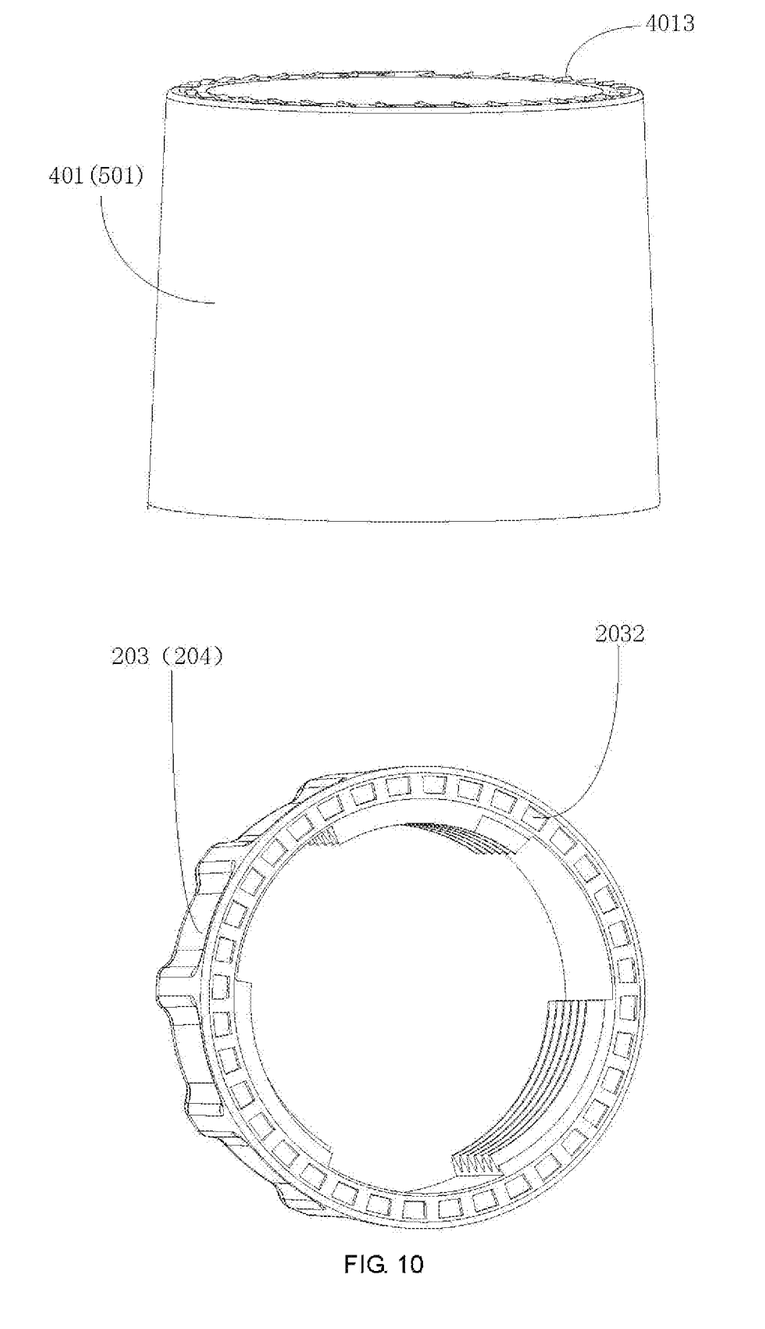
FIG. 10 is a schematic view of a locking structure of the first side cushion and the second side cushion according to the present invention.

Further, as shown in FIG. 10, one surface of the first sleeve 401 and/or the second sleeve 501 toward the first screw cap 203 and/or the second screw cap 303 are/is provided with a plurality of bumps 4013. The bumps 4013 are disposed along the circumference and are uniformly distributed at intervals.

Further, as a preferred embodiment of the present invention, the bumps 4013 are in a "slope" shape. The opening end surface of the first screw cap 203 and/or the second screw cap 303 is provided with a plurality of pits 2032 adaptive to and in the same number as the bumps 4013. When being assembled, the first side cushion 40 and/or the second side cushion 50 sleeves the mounting rod 10 and is fixed by the first screw cap 203 and/or the second screw cap 303. For example, when the first screw cap 203 is screwed in with the threads, gradually approaches and makes contact with the first sleeve 401, and is continuously screwed in with force, the bumps 4013 are correspondingly engaged with the pits 2032. As the first screw cap 203 continues to be engaged with the threads, the bumps 4013 will be misaligned with the previously engaged pits 2032 and are re-engaged with the next pits 2032 until the first screw cap 203 cannot be screwed in, and the bumps 4013 are tightly engaged with the pits 2032. When the slope of the "slope" bumps 4013 is made sufficiently large, the first nut 203 cannot be screwed off and can be deadlocked on the mounting rod 10 since the tops of the "slope" bumps 4013 form a larger resistance.

As a preferred embodiment of the present invention, the bumps 4013 may also be in the shape of a "hill" or an "isosceles triangle". As the first screw cap 203 is engaged with the threads, the bumps 4013 will be misaligned with the previously engaged pits 2032 and re-engaged with the next pits 2032 until the first screw cap 203 cannot be screwed in, and the bumps 4013 are tightly engaged with the pits 2032. Since the bumps form a certain resistance, the first screw cap 203 cannot be easily screwed off and can be securely fixed on the mounting rod 10.

Such technical feature can prevent the first side cushion 40 and/or the first side cushion 50 from being loosened or even detached due to the shake during driving, so that the structure of the present invention is more stable and safer to use.

Similarly, the feature can be further applied to the fixing mechanism 110. The surface of the fixing groove 1121 on the rear cover plate 1110 is provided with a plurality of bumps. The bumps are circumferentially disposed at even intervals. The bumps may be in any one of a "slope" shape, a "hill" shape, or an "isosceles triangle" shape. The opening end surface of the fixing nut 1132 is provided with a plurality of pits adaptive to and in the same number as the bumps (not shown). When being assembled, the fixing screw 1131 is screwed into the fixing hole 1120 and fixed by the fixing nut 1132. As the fixing nut 1132 is engaged with the threads, the bumps will be misaligned with the previously engaged pits and re-engaged with the next pits until the fixing nut 1132 cannot be screwed in. The fixing nut 1132 cannot be easily screwed off and can be securely fastened to the mounting rod 10 since the bumps form a certain resistance action.

Figure 5:
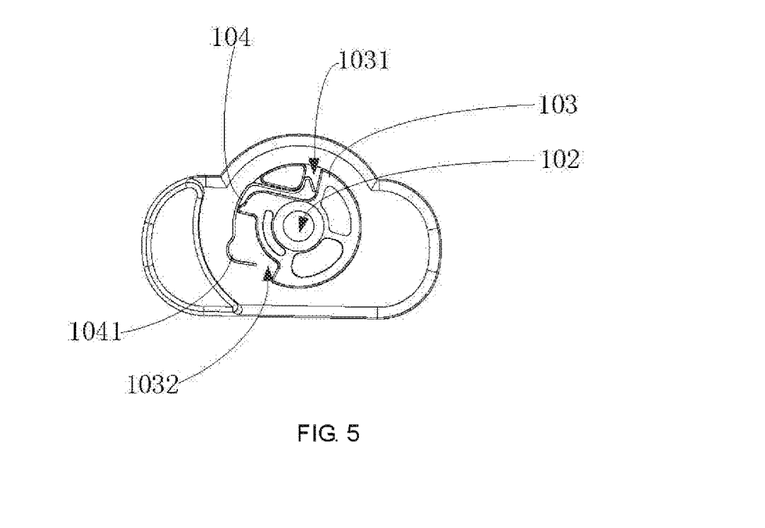
FIG. 5 is a schematic structural view of the end face of a mounting rod according to the present invention.
Figure 9:
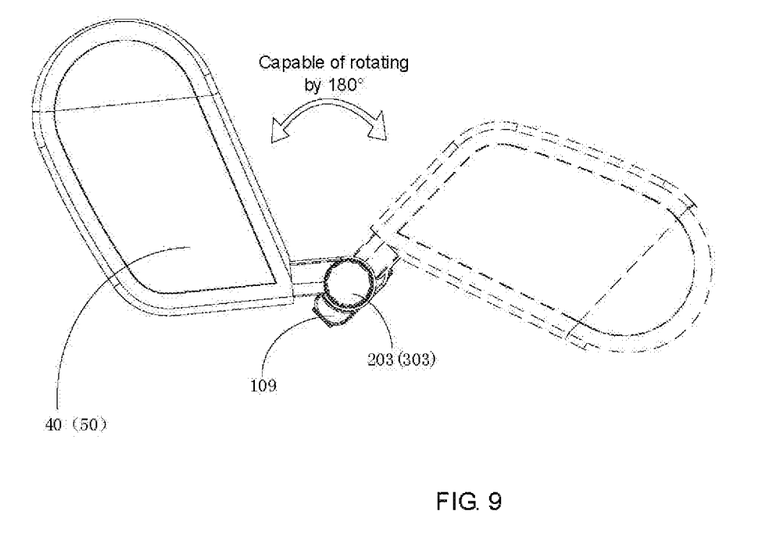
FIG. 9 is a schematic view of rotation of the first side cushion and the second side cushion according to the present invention.

Further, FIG. 5 is a schematic view of a gear position adjusting structure of the automobile side back cushion according to the present invention. The end part of the mounting rod 10 is provided with a raised part 103 and an elastic piece 104. The raised part 103 is provided with an elastic piece groove 1031 and a notch 1032. One end of the elastic piece 103 is engaged with the raised part 103 by the elastic piece groove 1031. The notch 1032 is used for accommodating a bent part 1041 formed by bending the other end of the elastic piece 104. A plurality of gear slots 2013 are disposed in the inner side wall of the first annular step part 2011 of the rotary connecting member 20 or the second annular step part 3011 of the second rotary connecting member 30 at intervals. The bent part 1041 is adapted to the gear slots 2013. In a preferred embodiment of the present invention, as shown in FIG. 5, six gear slots 2013 are disposed. An included angle of 30° is formed between two adjacent gear slots 2013. Due to the six gear slots 2013, the first side cushion 40 and the second side cushion 50 can be rotated by 180° (referring to FIG. 9). The fixation of upper and lower six positions can be realized by the cooperation of the elastic piece 104 and the gear slots 2013 during the rotation. Therefore, the first side cushion 40 and the second side cushion 50 can adapt to the height requirements of different persons. The heads of the passengers of different heights are limitedly fixed to improve the comfort level during sleep while the passengers are protected from the injury when the automobile is collided. The product is also caused to achieve a universal effect.

Further, as shown in FIG. 5, the end surface, of the mounting rod 10 is further provided with a limiting structure 109. The limiting structure 109 is in a "curved moon" shape and is disposed on one side close to the rear cover plate 1110. The setting of the limiting structure 109 can further limit the rotary angle of the first side cushion 40 or the second side cushion 50 to a maximum range of 180° (referring to FIG. 9). Therefore, the interference on the rear seat passenger caused by the fact the first side cushion 40 or the second side cushion 50 is rotated to the back side of the automobile seat due to the rotary angle greater than 180° can be effectively prevented.

Further, as shown in FIG. 3 the first side cushion 40 or the second side cushion 50 includes: a decorative wing cover 405, a soft cushion part 402 correspondingly matched with the decorative wing cover 405 and an outer casing 404. A bracket 403 is further disposed between the decorative wing cover 405 and the soft cushion part 402. The soft cushion part 402 wraps the bracket 403. The bracket 403 extends toward the decorative wing cover 405 to form a hook part 407, The decorative wing cover 405 is provided with a groove 408 corresponding to the hook part 407. The decorative wing cover 405 and the soft cushion part 402 are connected by combining the hook part 407 and the groove 408. The decorative wing cover 405 is connected to the outer casing. Due to such feature, flexible support is provided for the head of the passenger from the side, the head and neck of the passenger can be effectively protected, and the comfort of the passenger during sleep can be better improved. The passenger can also be protected from accidental injuries in the event of an automobile collision, and the driving safety is improved.

Specifically, the soft cushion part 402 is made of a slow rebound sponge material, which, is not easy to damage while being fixed, and is comfortable to use. When in production, the soft cushion part 402 is integrally formed with the bracket 403. Due to such feature, the first side cushion 40 and the second side cushion 50 are more stable in structure and more durable. Besides, the use of glue can be reduced, thereby causing the technology to be simpler and more environment-friendly.

Preferably, the outer casing 404 is further provided with a LOGO position 406, and the LOGO position 406 is a groove for mounting a production company LOGO.

Figure 7:
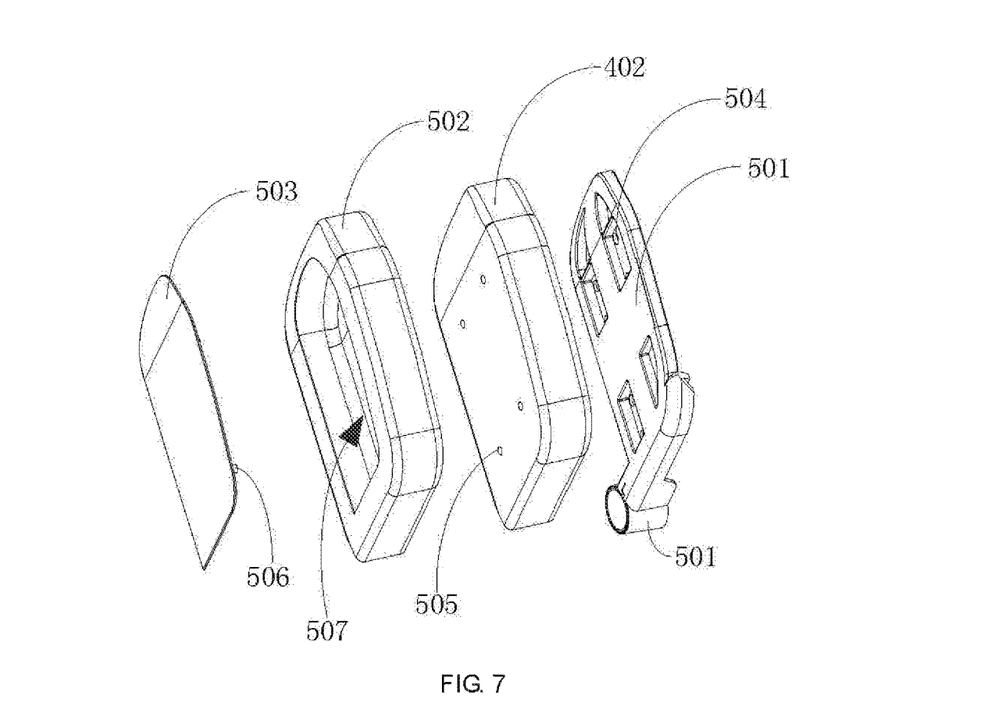
FIG. 7 is a schematic structural view of a first, side cushion and a second side cushion according to a second embodiment of the present invention.

Optionally, as shown in FIG. 7, the second embodiment according to the present invention differs from the first embodiment in the structures of the first side cushion 40 and the second side cushion 50.

Specifically, the first side cushion 40 or the second side cushion 50 includes: a framework 509, a wing piece 508, and the soft cushion part 402 wrapping the periphery of the wing piece 508, as well as a soft outer wrap 502 wrapping the soft cushion part 402 and a decorative plate 503 back to the cushion surface. The decorative plate 503 extends toward the wing piece 508 to form a mounting raised column 506. The upper, lower, left and right parts of the surface of the framework 509 are provided with four first mounting holes 504 respectively. The mounting raised column 506 penetrates through the soft cushion part 402 to be connected to the wing piece 508. The soft filler is made of a slow rebound sponge material, and is also correspondingly provided with four second mounting holes 505. The second mounting holes 505 penetrate through, the soft filler 402 to be communicated with the first mounting holes 504. The soft outer wrap 502 may be made of a genuine leather, leather or cloth material. The soft outer wrap 502 wraps the outer part of the soft filler 402. A side of the decorative plate 503 toward the soft outer wrap 502 is provided with four mounting raised columns 506 adaptive to the first mounting holes 504 and the second mounting holes 505. The soft outer wrap 502 is provided with a decorative groove 507 adapted to the decorative plate 503. The decorative plate 503 is fixed on the first mounting holes 504 by the cooperation between the mounting raised columns 506 and the decorative groove 507. When the automobile headrest is actually produced, the soft outer wrap 502 and the decorative plate 503 may have different color combinations, so that the effect of matching according to different user preferences or according to the automobiles of different colors can be achieved, and the automobile headrest becomes more fashionable.

The foregoing contents are detailed description of the disclosure in conjunction with specific preferred embodiments and concrete embodiments of the disclosure are not limited to these description. For the person skilled in the art of the disclosure, without departing from the concept of the disclosure, simple deductions or substitutions can be made and should be included in the protection scope of the application.

What is claimed is:

1. An automobile side back cushion, disposed on a first inserting rod and a second inserting rod on a top of a seat, wherein the automobile side back cushion comprises:
  a mounting rod, comprising a first chute and a second chute disposed at an interval, and an adjusting channel disposed between the first chute and the second chute; and the first chute and the second chute being communicated by the adjusting channel; and
  a first side cushion and a second side cushion, which are respectively connected to two ends of the mounting rod; the automobile side back cushion further comprises
  a width adjusting structure, comprising:
    a first fastening frame, comprising at least one first inserting rod groove accommodated in the first chute, and a first gear bar fixed on the outer side of the first inserting rod groove;
    a second fastening frame, comprising at least one second inserting rod groove accommodated in the second chute, and a second gear bar fixed on the outer side of the second inserting rod groove; and an adjusting gear disposed in the adjusting channel;
wherein
the first fastening frame and the second fastening frame are disposed in a mirror image manner; the first gear bar and the second gear bar oppositely extend along the adjusting channel and are simultaneously occluded with the adjusting gear, such that the adjusting gear drives the first fastening frame and the second fastening frame moving in a first direction towards each other and moving in a second direction opposite to each other;
wherein the two ends of the mounting rod are provided with a first rotary connecting member and a second rotary connecting member respectively;
the first rotary connecting member comprises a first columnar part connected to the mounting rod and a first screw cap spaced from the mounting rod and in threaded connection with the first columnar part; and the first side cushion is provided with a first sleeve adapted to the first columnar part, and the first sleeve sleeves the first columnar part and is fixed by the first screw cap;
the second rotary connecting member comprises a second columnar part connected to the mounting rod and a second screw cap spaced from the mounting rod and in threaded connection with the second columnar part; and the second side cushion is provided with a second sleeve adapted to the second columnar part, and the second sleeve sleeves the second columnar part and is fixed by the second screw cap; and
cushion surfaces of the first side cushion and the second side cushion are opposite to each other.

2. The automobile side back cushion according to claim 1, wherein the width adjusting structure further comprises: an adjusting knob disposed on the outer side of the mounting rod and a connecting shaft; and the adjusting knob is connected to the adjusting gear by the connecting shaft to control the adjusting gear to rotate.

3. The automobile side back cushion according to claim 1, wherein the first columnar part and the second columnar part are convexly provided with a bayonet respectively, and an inner wall of the first sleeve and an inner wall of the second sleeve are concavely provided with a bayonet groove adapted to the bayonet respectively, such that the first sleeve and the second sleeve are stabilized with the first columnar part and the second columnar part.

4. The automobile side back cushion according to claim 1, wherein sides of the first columnar part and the second columnar part toward the mounting rod are provided with an annular groove respectively, an inner wall of the annular groove is provided with a plurality of gear slots, and a bent part is adapted to the plurality of gear slots;
the mounting rod is provided with an adapted raised part toward the annular groove, and an elastic piece groove is disposed from an outer wall of the adapted raised part; and the automobile side back cushion further comprises an elastic piece, one end of the elastic piece is fixed in the elastic piece groove, and another end extends along a direction, gradually away from the adapted raised part, of an end surface of the mounting rod to form the bent part, and the bent part cooperates with the plurality of gear slots to impart the rotation of the first columnar part and the second columnar part around a raised part main shaft in a split gear manner.

5. The automobile side back cushion according to claim 3, wherein sides of the first columnar part and the second columnar part toward the mounting rod are provided with an annular groove respectively, an inner wall of the annular groove is provided with a plurality of gear slots, and a bent part is adapted to the plurality of gear slots;
the mounting rod is provided with an adapted raised part toward the annular groove, and an elastic piece groove is disposed from an outer wall of the adapted raised part; and the automobile side back cushion further comprises an elastic piece, one end of the elastic piece is fixed in the elastic piece groove, and another end extends along a direction, gradually away from the adapted raised part, of an end surface of the mounting rod to form the bent part, and the bent part cooperates with the plurality of gear slots to impart the rotation of the first columnar part and the second columnar part around a raised part main shaft in a split gear manner.

6. The automobile side back cushion according to claim 1, wherein surfaces of the first sleeve and the second sleeve toward the first screw cap and the second screw cap respectively are provided with a plurality of bumps; and
the first screw cap and the second screw cap are provided with a plurality of pits adapted to the plurality of bumps by corresponding to the first sleeve and the second sleeve respectively.

7. The automobile side back cushion according to claim 3, wherein surfaces of the first sleeve and the second sleeve toward the first screw cap and the second screw cap respectively are provided with a plurality of bumps; and
the first screw cap and the second screw cap are provided with a plurality of pits adapted to the plurality of bumps by corresponding to the first sleeve and the second sleeve respectively.

8. The automobile side back cushion according to claim 1, wherein the first side cushion and/or the second side cushion comprises: a decorative wing cover and a cushion part corresponding to the decorative wing cover, a bracket is further disposed between the decorative wing cover and the cushion part, and the cushion part wraps the bracket; and
the bracket extends toward the decorative wing cover to form a hook part, the decorative wing cover is provided with a groove corresponding to the hook part, and a connection between the decorative wing cover and the cushion part is accomplished by combining the hook part and the groove.

9. The automobile side back cushion according to claim 1, wherein the first side cushion and/or the second side cushion comprises: a wing piece, a filler wrapping the periphery of the wing piece, a outer wrap wrapping the filler and a decorative plate disposed back to a cushion surface; the decorative plate extends toward the wing piece to form a mounting raised column, and the mounting raised column penetrates through the filler to be connected to the wing piece.

10. An automobile seat, comprising a seat body and a headrest above the seat body, wherein a bottom of the headrest is provided with inserting rods, a top of the seat body is provided with inserting holes corresponding to the inserting rods, the headrest is fixed with the seat body by the inserting rods and the inserting holes, the automobile seat further comprises the automobile side back cushion according to claim 1, and the automobile side back cushion is fixed between the seat body and the headrest by the inserting rods.

11. An automobile side back cushion, disposed on a first inserting rod and a second inserting rod on the top of a seat, wherein the automobile side back cushion comprises:
a mounting rod, comprising a first fastening hole and a second fastening hole adapted to the first inserting rod and the second inserting rod, such that the mounting rod is fixed on the first inserting rod and the second inserting rod; and a first side cushion and a second side cushion, which are respectively connected to two ends of the mounting rod; wherein the two ends of the mounting rod are respectively provided with a first rotary connecting member and a second rotary connecting member;

the first rotary connecting member comprises a first columnar part connected to the mounting rod and a first screw cap spaced from the mounting rod and in threaded connection with the first columnar part; and the first side cushion is provided with a first sleeve adapted to the first columnar part, and the first sleeve sleeves the first columnar part and is fixed by the first screw cap;

the second rotary connecting member comprises a second columnar part connected to the mounting rod and a second screw cap spaced from the mounting rod and in threaded connection with the second columnar part; and the second side cushion is provided with a second sleeve adapted to the second columnar part, and the second sleeve sleeves the second columnar part and is fixed by the second screw cap; and cushion surfaces of the first side cushion and the second side cushion are opposite to each other;

wherein the first side cushion and/or the second side cushion comprises: a decorative wing cover and a cushion part corresponding to the decorative wing cover, a bracket is further disposed between the decorative wing cover and the cushion part, and the cushion part wraps the bracket; and the bracket extends toward the decorative wing cover to form a hook part, the decorative wing cover is provided with a groove corresponding to the hook part, and connection between the decorative wing cover and the cushion part is accomplished by combining the hook part and the groove.

* * * * *